US011751657B2

(12) United States Patent
Friedman et al.

(10) Patent No.: US 11,751,657 B2
(45) Date of Patent: *Sep. 12, 2023

(54) SYSTEM AND METHOD FOR AN ENHANCED HAIR DRYER

(71) Applicant: Spur Concepts Inc, San Diego, CA (US)

(72) Inventors: Jonathan Friedman, San Diego, CA (US); Ryan Goldman, San Diego, CA (US); Zachary Rattner, San Diego, CA (US)

(73) Assignee: SPUR CONCEPTS INC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,026

(22) Filed: Jun. 23, 2020

(65) Prior Publication Data

US 2020/0315313 A1 Oct. 8, 2020

Related U.S. Application Data

(63) Continuation of application No. 16/038,020, filed on Jul. 17, 2018, now Pat. No. 10,687,597, which is a
(Continued)

(51) Int. Cl.
*A45D 20/12* (2006.01)
*A45D 20/10* (2006.01)
(Continued)

(52) U.S. Cl.
CPC ............ *A45D 20/12* (2013.01); *A45D 20/10* (2013.01); *F26B 21/001* (2013.01); *F26B 21/10* (2013.01);
(Continued)

(58) Field of Classification Search
CPC .......... F26B 21/00; F26B 21/10; F26B 23/04; F26B 23/06; F26B 21/001; A45D 20/12;
(Continued)

(56) References Cited

U.S. PATENT DOCUMENTS 4,542,284 A * 9/1985 Thaler .................. G08B 21/185
219/492
5,636,318 A * 6/1997 Polaert ..................... A45D 20/12
34/268
(Continued)

FOREIGN PATENT DOCUMENTS

WO WO-2018023117 A1 * 2/2018 .......... H01M 10/623

*Primary Examiner* — Stephen M Gravini
(74) *Attorney, Agent, or Firm* — Michael R Shevlin

(57) ABSTRACT

A system and method for an intelligent hair drying/styling apparatus with user information transmission and storage capabilities is herein provided. The hair drying/styling apparatus houses a control circuit board and an infrared or temperature sensor (or camera) in order detect an individual's hair condition moisture level to determine a user specific, customizable dryer setting. The information detected by the sensor is stored locally, on a proximal Internet-enabled device, or on a remote or cloud-based server and accessed by the hair drying/styling apparatus through a wireless local area network connectivity function. Accordingly, a user's hair temperature-drying profile may be stored and later recalled to provide optimal hair styling setting customized for that user. This innovation will enable any number of hair professionals and or end consumers to improve styling and dry time. Such a profile may contain a proprietary V-Factor calculation that will, among other applications, correspond to the use of a coordinated and optimized hair spray solution. According to the present invention, energy usage is reduced to enable a more efficient design.

19 Claims, 14 Drawing Sheets

Related U.S. Application Data continuation of application No. 15/663,735, filed on Jul. 29, 2017, now Pat. No. 10,021,952.

(60) Provisional application No. 62/368,962, filed on Jul. 29, 2016.

(51) Int. Cl.

| | |
|---|---|
| *F26B 21/00* | (2006.01) |
| *H01M 10/613* | (2014.01) |
| *H01M 10/623* | (2014.01) |
| *H01M 10/643* | (2014.01) |
| *H01M 10/6563* | (2014.01) |
| *H01M 50/213* | (2021.01) |
| *F26B 21/10* | (2006.01) |
| *F26B 23/04* | (2006.01) |
| *F26B 23/06* | (2006.01) |
| *H01M 10/6235* | (2014.01) |

(52) U.S. Cl.
CPC .............. *F26B 23/04* (2013.01); *F26B 23/06* (2013.01); *H01M 10/613* (2015.04); *H01M 10/623* (2015.04); *H01M 10/643* (2015.04); *H01M 10/6563* (2015.04); *H01M 50/213* (2021.01); *A45D 2200/00* (2013.01); *H01M 10/6235* (2015.04); *H01M 2200/10* (2013.01); *H01M 2220/30* (2013.01)

(58) Field of Classification Search
CPC ...... A45D 20/10; A45D 2/40; A45D 2200/10; H01M 10/613; H01M 10/623; H01M 50/213; H01M 10/643; H01M 10/6563; H01M 10/6235; H01M 2200/10; H01M 2220/30

USPC ...................... 34/549, 96–100; 132/211, 224
See application file for complete search history.

(56) References Cited

U.S. PATENT DOCUMENTS

| | | | | |
|---|---|---|---|---|
| 6,026,821 | A * | 2/2000 | Last ...................... | A45D 20/12 132/200 |
| 7,093,376 | B2 * | 8/2006 | Regen ..................... | A45D 20/12 132/200 |
| 7,946,056 | B2 * | 5/2011 | Kroll ..................... | A45D 20/42 34/96 |
| 8,058,617 | B2 * | 11/2011 | Vincent .................. | G01N 21/84 250/339.01 |
| 8,434,238 | B2 * | 5/2013 | Gross ..................... | A45D 20/12 34/96 |
| 9,138,038 | B2 * | 9/2015 | deGrood .................. | A45D 1/04 |
| 9,681,726 | B2 * | 6/2017 | Moloney ................. | A45D 20/10 |
| 9,808,066 | B2 * | 11/2017 | Moloney ................. | A45D 20/122 |
| 9,839,274 | B1 * | 12/2017 | Brickner ................. | H04B 1/3833 |
| 10,021,952 | B2 * | 7/2018 | Goldman .............. | F26B 21/001 |
| 10,299,558 | B2 * | 5/2019 | Yifrach .................. | F23L 3/00 |
| 10,405,630 | B2 * | 9/2019 | Goldman .............. | A45D 20/12 |
| 10,608,297 | B2 * | 3/2020 | Goldman .............. | A45D 20/12 |
| 10,687,596 | B2 * | 6/2020 | Goldman .............. | F26B 23/06 |
| 10,687,597 | B2 * | 6/2020 | Goldman .............. | F26B 21/10 |
| 11,000,104 | B2 * | 5/2021 | Goldman .............. | F26B 23/04 |
| 11,033,089 | B2 * | 6/2021 | Goldman .............. | F26B 21/10 |
| 2004/0040948 | A1 * | 3/2004 | Mandell ................. | A45D 20/12 219/222 |
| 2013/0160316 | A1 * | 6/2013 | Hadden .................. | A45D 20/00 34/96 |
| 2020/0315313 | A1 * | 10/2020 | Friedman .............. | A45D 20/40 |
| 2020/0345118 | A1 * | 11/2020 | Friedman ............. | H01M 10/613 |
| 2021/0022471 | A1 * | 1/2021 | Goldman ............ | H01M 10/623 |

* cited by examiner

*Green Light: temperature below 90°F*

*Yellow Light: temperature below 90 and 100°F*

*Red Light: temperature above 100°F*

SYSTEM AND METHOD FOR AN ENHANCED HAIR DRYER

CROSS REFERENCE TO RELATED APPLICATIONS

This application is a continuation of U.S. patent application Ser. No. 16/038,020, filed on Jun. 17, 2018, is a continuation of U.S. patent application Ser. No. 15/663,735, filed on Jul. 29, 2017, which claims priority from U.S. Provisional Patent Application No. 62/368,962, filed on Jul. 29, 2016, the contents of which are incorporated herein by reference.

FIELD

This invention relates to the general field of hair dryers, and specifically toward an intelligent hair drying/styling apparatus with user information transmission and storage capabilities.

BACKGROUND

Although humans have a large range of different hair types: density, length, coarseness, sheen, moisture content, follicle thickness, curliness, and others, hair dryers are traditionally "one-size fits all" and treat all hair the same. Hair can be damaged from overheating created by powerful dryers. While many companies already produce hundreds of different types of hair dryers, none provide a comprehensive and intelligent feedback mechanism and interactive experience to optimize the drying and styling of hair. Nowhere in the prior art is an enhanced hair dryer taught with the ability to profile a human scalp and then later "call up" such a profile to optimize subsequent hair drying/styling experiences. In particular, relatively few advances exist whereby scalp or hair profiling is combined with, either intelligent adjustments, alerts, wind speed and temperature adjustments, or other hair drying/styling modification experiences.

The primary aspects involved in the majority of hair drying/styling devices involve a heating coil and a rotating fan housed within a protective outer shell. When power is supplied to the device, the heating coil responds by heating the air within the apparatus. The heated air is then forcefully expelled out of the device through a rotating fan. When used as a hair styling tool, this results in accelerating the process of removing moisture absorbed within the hair follicle by rapidly heating the temperature of the hair. Consequently, microprocessor control of air thermodynamic properties is not taught whereby hair profiles may be stored and later retrieved. Furthermore, said stored profiles being developed through the use of hair sensing mechanisms such as infrared detectors or cameras is not taught. These profiles may contain the "V-Number": The V-Number is calculated as a weighted, normalized average of the aforementioned components, including but not limited to density, length, coarseness, sheen, moisture content, follicle thickness, and curliness. A version of this formula is described below:

$$\text{Hair\_density} \times \text{HD\_Normalization\_Factor} \times \text{HD\_Weighting} + \text{Length} \times \text{L\_Normalization\_Factor} \times \text{L\_Weighting} + \text{Coarseness} \times \text{C\_Normalization} \times \text{C\_Weighting} + \text{Sheen} \times \text{S\_Normalization\_Factor} \times \text{S\_Weighting\_Factor} + \text{Moisture} \times \text{M\_Normalization\_Factor} \times \text{M\_Weighting} + \text{Follicle\_thickness} \times \text{FT\_Normalization\_Factor} \times \text{FT\_Weighting\_Factor} + \text{Curliness} \times \text{Curliness\_Normalization\_Factor} \times \text{Curliness\_Weighting\_Factor} + \text{OtherN} \times \text{OtherN\_Normalization\_Factor} \times \text{OtherN\_Weighting\_Factor}$$

Due to a multitude of variabilities, the structure of hair follicles varies per person, with each individual requiring a customized setting for the level of heat generated by the heating coil and the speed of which the hot air is expelled from the hair drying/styling device. Offering a standard amount of different control settings for heat and speed allows for greater device control, however still fails to address the complexity of variables of an individual's hair follicle structure. No prior art teaches sensing the actual hair on a human subject, and then analyzing/storing those parameters for later usage.

The artificial hair coloring process is complex and steps are taken to preserve the color for as long as possible, including refraining from washing hair and preventing hair from receiving excess heat. Our technology may have a dedicated setting for situations in which the user has completed a hair coloring process, and a proprietary algorithm will compensation for the treatment to increase the longevity of the color process.

To access the level of moisture contained within the hair follicle, it is beneficial for the hair drying/styling device to contain a temperature sensing tool, such as an infrared thermometer or thermal camera. The device may also implement a circuit board and display monitor that allows for the camera to send the information to the display so that the user is able to view the sensing data, or the display could be a proximal device such as a smartphone or tablet. The circuit board may be configured in such a way as to interpret the data from the thermometer camera to establish the optimal temperature needed to dry the hair follicle while minimizing damage that results from excessive heat. Consequently, most if not all prior art dryers tend to over dry hair and can even damage it. The prior art fails to teach or suggest deriving optimal temperature data which may be used to develop a personalized profile for the user of the hair drying/styling device, and can be stored within the device or transmitted to a local or cloud-based server through a wireless local area network capability, such as a Wi-Fi or Bluetooth connection, to be accessed each time the device is used by that specific user.

Traditional hair dryers use open coil heating elements, which is a resistive wire that dissipates heat when electric current is passed through it. Such heating elements are relatively inexpensive and heat up quickly so they have been popular in hair dryers. However, the heat outputted by open coil heating elements cannot be channeled in a particular direction very easily—the heat radiates from all directions from the wire. For this and various other reasons, some hair dryer manufacturers have been including quartz infrared bulbs as heating elements in addition to nichrome wire. These bulbs tend to have tungsten filaments and are essentially light bulbs that are tuned to emit heat in the form of infrared light.

The benefits of infrared light are well-documented in the beauty domain, and the bulb has various other properties that are applicable for use in a drying device. For example, typical infrared bulbs have a rated life of at least 5,000 hours. Assuming each hair drying session lasts 15 minutes, this covers 20,000 hair drying sessions. Since the unit is a light bulb, techniques for focusing and controlling lighting components can be used to control the heat output of the device, such as reflective coatings on the bulb that can direct the heat out the end of the unit, providing a finer grain of control than traditional nichrome heating elements. The infrared bulb has a fair amount of inertia—it takes up to 20 seconds to heat up to its peak temperature and also exhibits similar behavior when cooling down, and can be mitigated and taken advantage of for cooling.

Traditional hair dryers do not have an urgent design objective to minimize power consumption or waste heat. Waste heat is defined to be heat that warms the chassis of the unit without materially adding to the output of the device.

This invention relates to the systems and methods for interpreting the condition of a head of hair and optimizing the blow drying/styling experience and outcome. This including methods, devices, systems, and computer programs for understanding, optimizing, and interpreting multiple characteristics of human hair in order to provide information, interactive collaboration, and benefit to a plurality of users.

SUMMARY OF THE INVENTION

The present invention provides a hair drying/styling apparatus that is intelligent, and can be designed to be cordless or rechargeable. The hair drying/styling apparatus is able to detect and evaluate the structure and drying/styling requirements based on an individual's hair follicle structure. The present invention is an innovative hair dryer that uses cutting luminescent sensor technology (e.g., an infrared sensor or camera, etc.) to provide an optimal hair drying/styling experience customized to the user. The apparatus utilizes a variety of hardware, software and supporting applications within the apparatus structure.

One embodiment of the invention is an infrared temperature sensor that senses the temperature of the hair and scalp and provides feedback to the user and/or operator (e.g., professional salon stylist) to prevent overheating and thus damaging the hair. The feedback mechanism for the temperature sensor can be indicated through the following methods: a visual system of indicator lights on the side of the dryer apparatus housing; a sensory system where the device vibrates in the user's hand; an automatic functionality whereby the device emits a blast of cool air; and an audio indicator system that alerts the user with an alarm sound.

In order to determine the desired hair drying/styling settings, the device contains a set of sensors. These sensors are used to quantify key parameters about the environment that the hair is being dried in for controlling the airflow output as well as collecting sensor readings for user feedback information and education.

These sensors may be co-located on the device and wired directly into the product's logic board or with the use of a card that can be plugged into the motherboard. Alternatively, they may be accessible through parameters communicated to the product through a wireless link. The following paragraphs give examples of both types of sensors.

The first type of sensor is a temperature sensor that is used to ensure that the user's hair is being dried at the maximum temperature possible in such a way that does not damage the hair. The present invention is capable of utilizing multiple sensor technologies that can fulfil this functionality, including: contactless infrared thermometers; thermistors and contact thermometers.

Contactless infrared thermometers are able to measure the temperature of a material that the unit is being pointed at, and contact with the substance is not required. This is desirable for hair dryer functionality since it is generally not safe to touch the hair dryer directly to hair while the device is powered on.

A simple thermistor varies its electrical resistance in response to ambient temperature. This sensor could be used alone or in conjunction with a contactless infrared sensor to determine the temperature of the air inside the heating chamber, or ambient temperature outside. This would improve the accuracy and detail of the displayed data in addition to the temperature of the hair provided by the contactless infrared thermometer.

A contact thermometer operates similarly to a thermistor, but tends to also support a voltage output proportional to the measured temperature without the need for additional circuitry. It can be considered a more integrated optional alternative to the thermistor component.

There may also be a sensor within the drying/styling device to measure ambient humidity, which is used to determine when there is no longer sufficient water in the hair to be evaporated. This sensor functions as an input to the control algorithm to determine when the drying/styling process is complete.

The present invention also may contain a variety of sensors that measure the distance to a remote obstruction, serving as a component of the heat and airflow control algorithm that can determine how far the dryer is being held from the user's head.

An ultrasonic sensor can be used to give distance measurements several times per second. The drying/styling device also may use a time-of-flight infrared sensor that measures the time taken for emitted light to return to the sensor, and determines the distance based on return time. The drying/styling device can also estimate proximity with an infrared light and a signal processing integrated circuit.

The drying/styling device may use inertial sensors to measure the device's orientation and motion in space. These sensors are composed of three families: accelerometers which measure force acting on an object, gyroscopes which measure rotation around gravity, and magnetometers which measure orientation with respect to magnetic north. Many modern inertial sensors provide accelerometer, gyroscope, and magnetometer readings along x, y, and z-axes each. Such a sensor is referred to as a 9-axis sensor.

The drying/styling device may also implement the use of a camera that uses computer vision technologies such as facial and/or hair recognition to determine a user's hair type and style. The drying/styling device is also capable of communicating with a camera located on an external device such as a user's smartphone, tablet or laptop camera to collect image frames, analyze them, and communicate profile information to the dryer (e.g., optimal heat/airflow given hair style and desired output). In a preferred embodiment, the profile of a particular user may be correlated to a particular hair spray for that user, either through a range of hair sprays or even hair sprays fully customized for one particular user.

Likewise, the enhanced hair dryer according to the present invention may include diagnostic mechanisms to insure proper operation. For example, microphones can be used in conjunction with analyzed waveforms from other dryer units to determine if the unit is operating normally. It could enable the product to notify the user if a component such as the fan is failing by analyzing when it doesn't sound normal.

A force sensor (or network of force sensors) could be placed in the grip of the dryer to determine how the user is holding the handle and provide feedback by comparing values to professional stylists' data. This information could also be fused with IMU sensor data to gauge the effect of a particular grip on the output, dry time, etc.

EMF sensors are useful for determining the presence of magnetic fields. Some savvy hair dryer consumers are concerned about electromagnetic field (EMF) being emitted from hair dryers since these fields can damage human cells.

Onboard magnetic field sensors can provide peace of mind by ensuring the unit's generated fields are within safe limits.

A vibration sensor could be used to determine shock if the hair dryer unit has been dropped or damaged.

Light sensors can be used to determine how effective a camera sensor will be in analyzing the hair wetness. For example, a light sensor such as a phototransistor or photo resistor would be able to detect if the room is too dark for the camera to give meaningful information.

In addition to reporting status information to the user's mobile device or a cloud server, the drying/styling device includes several onboard actuators that can be controlled by an algorithm in response to sensed conditions. The main actuator components include heating elements such as nichrome wire or quartz infrared elements that require a voltage difference across two terminals to generate heat. The temperature of the heating element increases with the voltage difference between the terminals. By using a relay, the control algorithm can select between several input voltages corresponding to heat levels. For example, 0V, 6V, 12V, and 24V could correspond to off/cold shot, low, medium, and high heat levels, respectively, or a pulse width modulation-based scheme could be used.

Similar to the heating element, the speed of DC fans within the drying/styling device can be controlled by varying the voltage level by using a DPDT relay or PWM. The drying/styling device may use a multi-colored status LED to determine the suitability of the current conditions. For example, a green light could indicate a suitable hair temperature, yellow could indicate the upper end of the acceptable range, and red could indicate that the hair is too hot.

The drying/styling device may give tactile feedback to the user through a vibration mechanism. By placing a motor in the product (such as in the handle), the user can be notified when the product should be used differently in space (e.g., orientation, speed, distance to head, etc.).

In order to give real-time feedback to the user, drying/styling device may also have an onboard speaker to play sounds in response to sensed conditions. This could be as simple as beeps when thresholds are exceeded, or verbal feedback through a local or remote speaker in response to particular conditions ("stop shaking so fast", "move the dryer further away", etc.)

In order to convey user profile information to the product from external sources (cloud server, phone, etc.) the drying/styling device may contain a wireless modem with both Wi-Fi and Bluetooth capabilities. The drying/styling device can communicate in several modes with Wi-Fi on board. When the product first boots up, it could boot into soft access point (soft AP) mode. The product would then show up as a Wi-Fi hotspot, and the user could connect to it via their mobile device.

Once connected to the hotspot, the mobile device can communicate the SSID/password of the home Wi-Fi network and cause the drying/styling device to connect by tearing down the soft AP connection and joining the specified network. When the drying/styling device connects to the network, it can make outbound calls to Internet services and retrieve profile information from a remote server. This may occur over a wide array of standards including HTTP(S) requests, Web Sockets, TCP/UDP sockets, etc.

Once the dryer is connected to the Internet, the device's functionality can be further advanced. Additional sensors in the environment could communicate with the device and further adapt the performance of this unit. For example, a Wi-Fi enabled thermostat could share ambient temperature and humidity information to the device. Furthermore, the user's personal profile could be shared with a cloud-profile server. This would enable the profile to be shared across multiple devices, as well as enabling the user to view and update the profile information. For example, when the user is traveling, a hotel dryer could adopt the parameters that were configured by the unit at home. Furthermore, parameters learned by a dryer could be shared where relevant to other styling products such as a flat iron, hot brush, etc.

The device usage information could also be shared with the cloud profile server for the purposes of comparing the user's usage patterns against other individuals, industry best practices, or aggregate metrics. Such a system would enable the devices to coach the user in improving their styling habits as they are used.

With a Bluetooth modem on the drying/styling device, the device would need to be in proximity to a mobile phone in order to communicate with the Internet. However, Bluetooth Low Energy is optimized for smaller data packets than Wi-Fi, and so may be desirable.

In order to implement the adaptive and communicative aspects of the drying/styling device, an embedded processor with storage and memory, such as an ARM Cortex M3 microprocessor, may be built within the housing of the drying/styling device.

On this processor, a real-time operating system (RTOS) can be used to interface with electrical protocols that have timing deadlines, such as SPI, I2C, or UART. Furthermore, responses to dangerous events such as excessive heat or blocked air ways are heavily time-dependent, therefore an RTOS is desirable.

Under an RTOS design, it is desirable to separate functionality that absolutely must be handled in a specific timeframe (e.g., interrupts) versus tasks that are permitted to take longer amounts of time and may be interrupted (e.g., writing a log file to storage).

The drying/styling device may use timestamps to indicate relative time between events. Timestamps may be stored as unsigned 32-bit integers representing the number of milliseconds since the device was powered on. These timestamps could be written into the queue, the central message broker that manages requests for work units to be performed. Commands are produced by interrupt events or the Dryer module and are consumed by the Dryer module. Commands are inserted in a first-come, first-served basis with the item at index 0 being the oldest. The Queue can either reside in the stack or heap, but the initial version of the product will allocate it in the stack so a fixed block memory can be statically allocated.

As the user begins to use more features of the drying/styling device, the expected time taken to process a Command in the queue once it is added may increase. If this becomes too long, it may become desirable to split the Queue into separate high priority and low priority queues where timing-critical applications are serviced first in the high-priority queue and work items of lesser importance are sent to the low priority queue.

The Queue stores timestamps associated with each Command and can adapt behavior depending on load. For example, if the delta time from a Command being inserted and serviced exceeds a threshold, other modules may be instructed to increase their period, more memory may be allocated for the queue (for heap-based Queues), or certain modules may shut off entirely.

The high-level product functionality of the drying/styling device is managed by the Dryer module. The Dryer sits in an idle loop or low-power sleep state waiting for Commands to be placed in the Queue. Once a Command is received, it performs the appropriate action (e.g., reading a sensor, controlling an actuator, etc.). In cases where a derivative action is determined to be required (e.g. a sensor reading command adds a new reading that needs to be flushed to a log buffer), the Dryer posts a command into the queue and returns immediately after the requested action is complete. This approach enables fair task management.

The Timer module posts Commands in the Queue that direct the Dryer module to perform certain actions at periodic intervals. These actions contain tasks such as sensor polling or flushing logs.

The drying device may embody attributes that each contribute to reducing the power requirement of the heating element, such as: time-delay heating circuitry; workaround for batteries with lower peak current ratings; leveraging lighting techniques for controlling heat output; and adding sensor technology for reducing excess heat.

Since the infrared bulb takes several seconds to reach its peak temperature, it is desirable to have additional power devoted towards the coil heater in the beginning to warm up the chamber and infrared bulb. Once a cutoff time and/or temperature has been reached, the additional nichrome elements would be powered off.

This circuitry can be implemented in a cost-effective manner using an RC network or 555 timer IC. For more complicated timing requirements, a microcontroller can be used. The microcontroller approach may be preferred if coupled with other enhancements that require more complicated calculations to be performed by the device to modulate the heat output.

Typical lithium ion battery cells have two current ratings—continuous discharge current, which defines how much current the cell can safely discharge for prolonged periods of time, and peak discharge current, which defines how much current the cell can safely discharge for shorter bursts of time. Lithium ion cells that have high peak discharge current tend to have lower capacity as a tradeoff, so it is desirable to find a cell that has as low a peak discharge rate as possible.

This limitation poses a problem for adding heating power when the unit is first powered on, since the current requirements could dictate a higher peak current. However, by placing the nichrome wire in a coil around the infrared bulb, a significant portion of the current budget could be directed to the nichrome wire when the unit is first powered on. This allows the wire to heat the chamber and infrared bulb for a certain amount of time, and then power could be switched to the infrared bulb after it has been heated by the nichrome. Such a design would allow the benefits of the time-delay heating circuitry to be realized without requiring higher peak current in the initial stages of operation.

In the home lighting space, LED lighting has increased in popularity recently due to the reduced power consumption compared to incandescent or fluorescent bulbs. However, unlike these other types of light bulbs, LEDs are inherently binary, meaning they can only be on or off. This poses a challenge from a home lighting perspective since the expectation is that many lights will be dimmable. One solution for this problem is to use a technique known as pulse width modulation (PWM). In PWM, instead of driving the LED with a constant voltage source over time, the voltage source is on for a particular percentage of the time. This causes the LED to flicker on and off, with the duration of each state dependent on a measure known as the duty cycle. A PWM signal with a duty cycle of 100% is on all of the time, where 75% would be on only 75% of the time. Using PWM and a frequency fast enough so the flicker is indistinguishable to the human eye, PWM can give the impression that an LED light is being dimmed, where in reality it is flickering on and off between completely on and off for a predetermined amount of time in each state.

One mechanism used within the drying device is the infrared bulb, which shares properties similar to the capacitor in the full wave rectifier circuit, and power consumption by the heating element can be further reduced by using PWM. Current is only drawn from the battery in the "on" state of PWM, resulting in power savings when the unit is in the "off" state. Since the infrared bulb has inertia (similar to the capacitor in the full wave rectifier), it takes some time to cool down. This property can be exploited here to drive the LED with a PWM signal instead of constant voltage for power savings. The infrared bulb will smooth out the peaks and troughs of the PWM signal.

To mitigate a severe drop in output temperature, the nichrome wire can be connected to a constant voltage source since it does not exhibit the inertial properties that the infrared bulb does.

The target temperature for the dryer to reach depends not on the temperature of the heating element alone, but the remote temperature of the hair, which will vary dependent on environmental conditions. By adding a sensor such as a contactless infrared thermometer, the dryer can measure the remote temperature of the hair and decrease the power output (e.g., decrease the PWM duty cycle) when the ideal hair temperature has been reached. Such a mechanism would be desirable as it would prevent the dryer from damaging the hair, and reduce power consumption by providing a temperature ceiling which should not be exceeded.

One aspect of this invention is to produce less heat waste and increase device efficiency. This can be achieved by improving the insulation material used around the heating element of the dryer, and recycling heat that would otherwise be wasted to improve the performance of the unit. By placing the ventilation holes toward the top of the battery, the design can take advantage of the cool airflow to ventilate the battery. From a performance standpoint, the excess heat coming off the battery pack would be directed toward the heating element, which boosts the performance of the dryer.

These and other features, embodiments, and aspects of the present invention can be appreciated from the following drawing description and detailed description of the preferred embodiment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
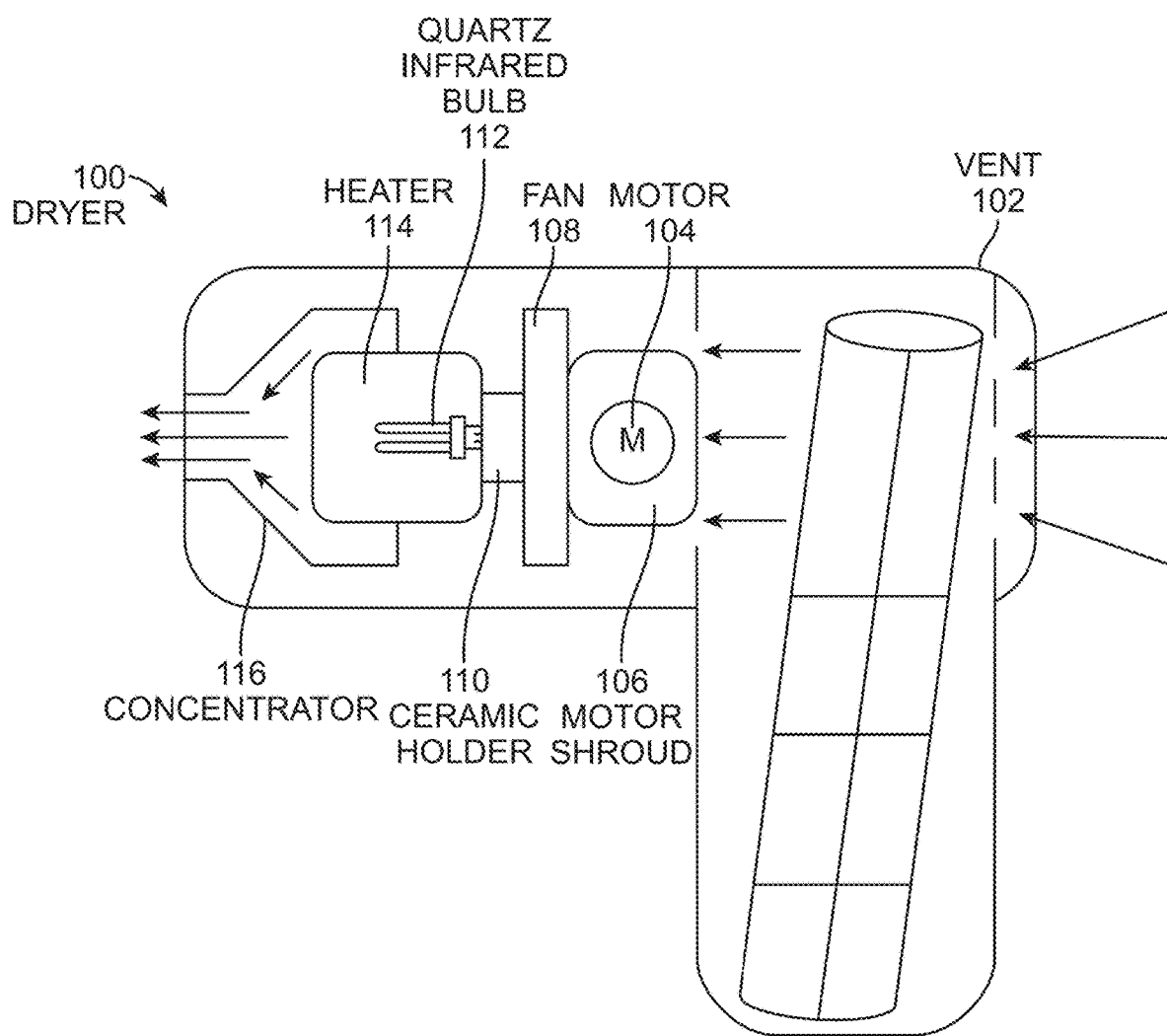
FIG. 1 is a schematic diagram overview of the overall key internal components within the drying device.

FIG. 1 is a schematic diagram overview of the overall key internal components within the drying device. in accordance with the preferred embodiment of the present invention, the drying device 100 utilizes vents 102 that allow for efficient airflow through the device. The drying device 100 utilizes a heating system that is made up of a fan 108 and a connected motor 104 that are housed within a motor shroud 106. A ceramic holder 110 connects the fan 108 and motor 104 to the heater 118. Heat is generated within the heater 118 by an internal quartz infrared bulb 112 that is held in place by the ceramic holder 110. Air is drawn through the motor powered 104 fan intake 108, and directed into the heater 114, heated up using the quartz infrared bulb 112 and through the exhaust by way of the connected concentrator 116 at the heating tip of the dryer.

Figure 2:
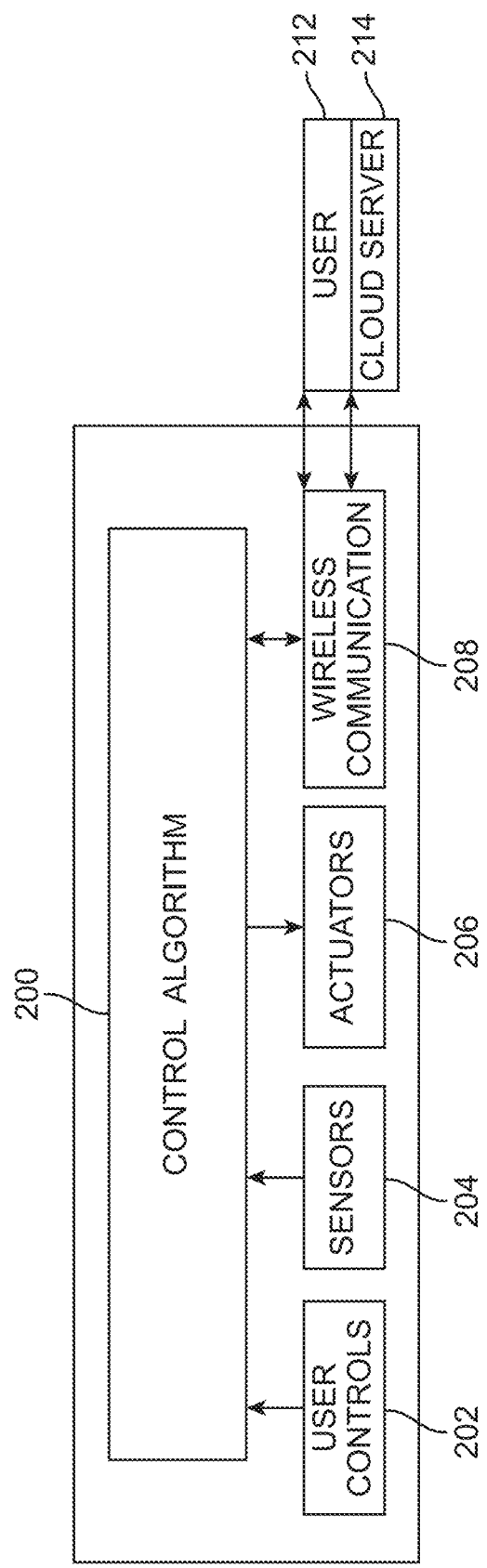
FIG. 2 is a block diagram overview of several functionality components of the drying/styling device.

FIG. 2 is a block diagram overview of several functionality components of the drying/styling device. In accordance with the preferred embodiment of the present invention, the drying/styling device is comprised of several components which make up the core control algorithm 200 that manages the key features of the device. The controlling output manages heat and airflow in response to explicit user controls 202. The controlling output responds to data gathered by the sensor readings 204. These collected sensor readings 204 are used for analysis and user feedback/education based on the specific user profile type, communicating with system actuators 206. The algorithm 200 interprets the user 212 profile information from data gathered from local user equipment through wireless communication 208. Profile information is interpreted using a remote server 214 over a wireless network connection.

Figure 3:
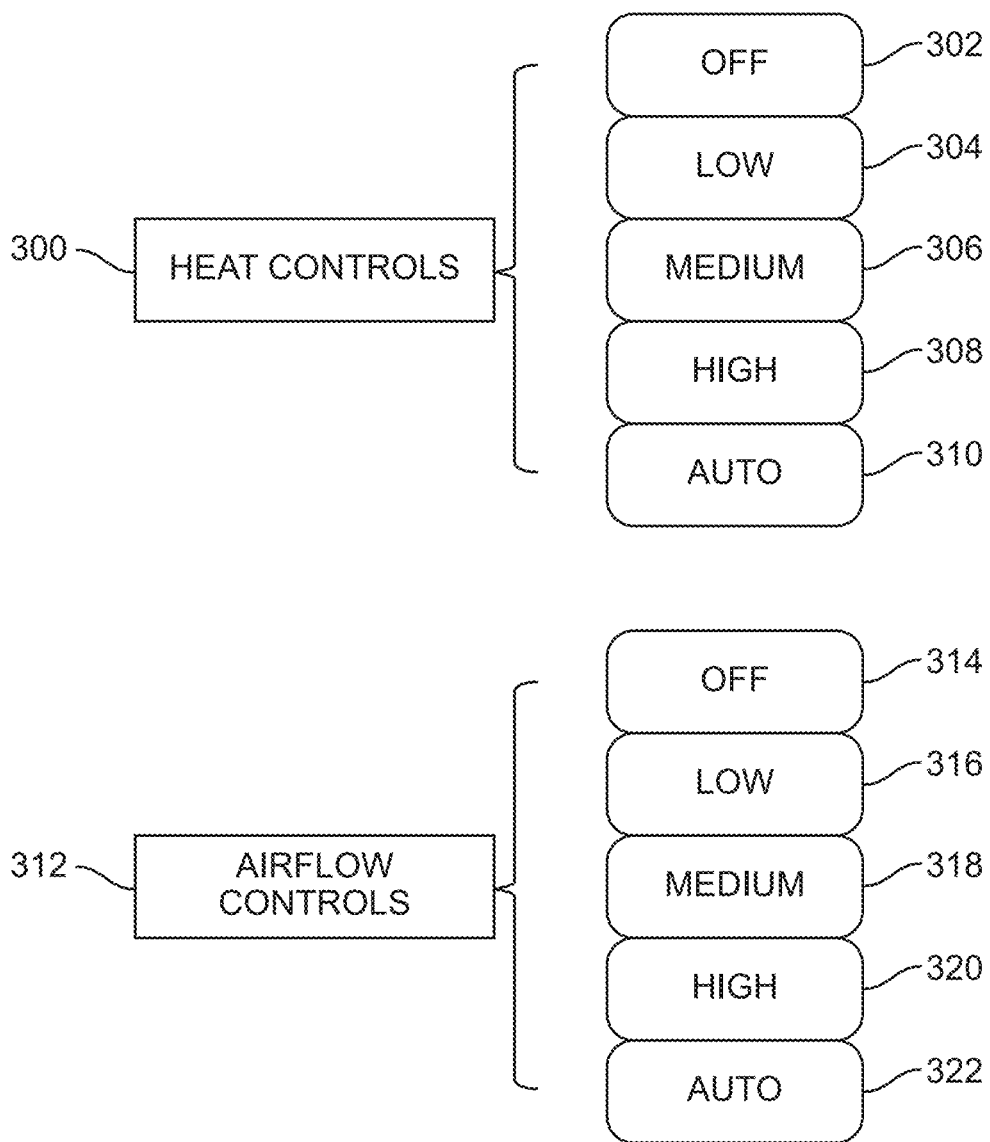
FIG. 3 is an overview of the user control settings shown displayed to the user of the drying/styling device.

FIG. 3 is an overview of the user control settings shown displayed to the user of the drying/styling device. In accordance with the preferred embodiment of the present invention, the user controls are the traditional components used to operate a hair dryer. These components include a component such as a button, knob, switch, or dial to control airflow 312 speed and heat 300. These controls serve as an override to the automatic determination algorithm. For instance, if a user specifies high heat 308 and low airflow 316, the output should be adjusted to reflect the setting, regardless of the sensor's readings except for safety limitations. The following user heat 300 controls could be provided: off 302; low 304; medium 306; high 308; and auto 310. The following user airflow 312 controls could be provided: off 314; low 316; medium 318; high 320; and auto 322. Alternatives include a subset of these fields (e.g., possibly eliminating the "medium" option), or a continuous sliding option from 0 to 100% capacity.

Figure 4:
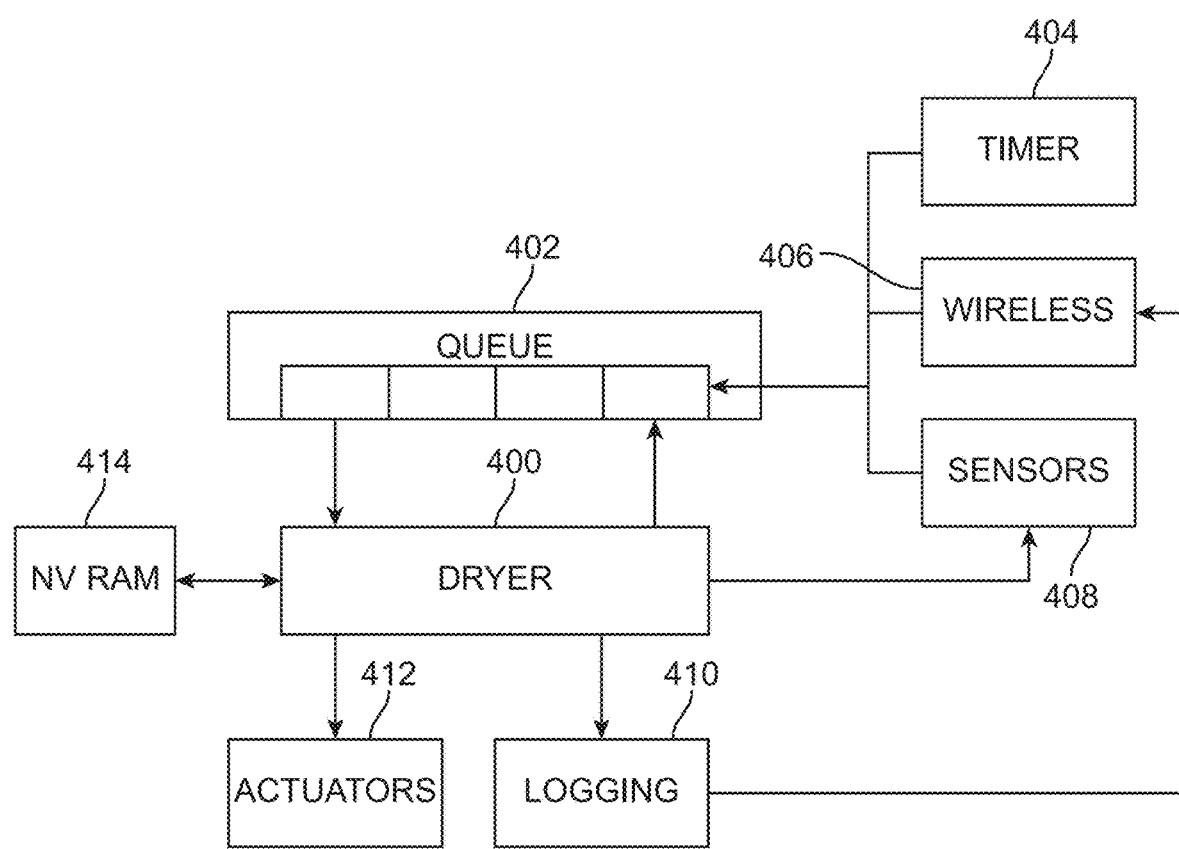
FIG. 4 is a block diagram that provides a high-level overview of the main components of the drying/styling device.

FIG. 4 is a block diagram that provides a high-level overview of the main components of the drying/styling device. In accordance with the preferred embodiment of the present invention, the main software components of the drying/styling device consist of the following: the "dryer" module 400, which sits on an idle loop waiting for commands to be placed into the queue 402 and performs the appropriate action once a command has been received; the "queue" module 402, which functions as the central message broker that manages requests for work units to be performed; the "timer" module 404, which posts commands to the queue that direct the dryer module to perform certain actions at periodic intervals; the "wireless" module 406 that is responsible for transmitting and receiving data; the "sensors" module 408, which communicates and transmits internal data from the drying/styling device's various sensing mechanisms; the "actuators" module 412, that controls heating and voltage through an algorithm based on the conditions detected by the sensors 408; the "NVRAM" module 414, nonvolatile memory that stores user preferences so that they can be preserved across power cycles as well as session and log data; and the "logging" module 410 that handles all request for status information to be sent to a remote interface for human or machine analysis. The logging module 410 utilizes four (4) interfaces for data entry and transmission. The log data can be stored on the drying/styling device through USB or Micro SD Card outputs, allowing for the dryer to write log information directly to the disk and perform a debug interface for analysis. Data can also be stored on an emulation platform, accessed through a filesystem, allows for off-target debugging and off-target log entry storage in identical format to that of an on-device Micro SD Card. Data can be stored on a cloud based server, accessed through a protocol such as HTTP POST WebSocket to allow the dryer to send diagnostic information to a remote server. Data can also be sent to a mobile device using a communication mechanism such as Bluetooth or HTTP POST WebSocket, whereby the drying/styling device can send diagnostic information to a mobile device such as a smartphone, tablet or laptop that is located within rough proximity to the drying/styling device.

Figure 5:
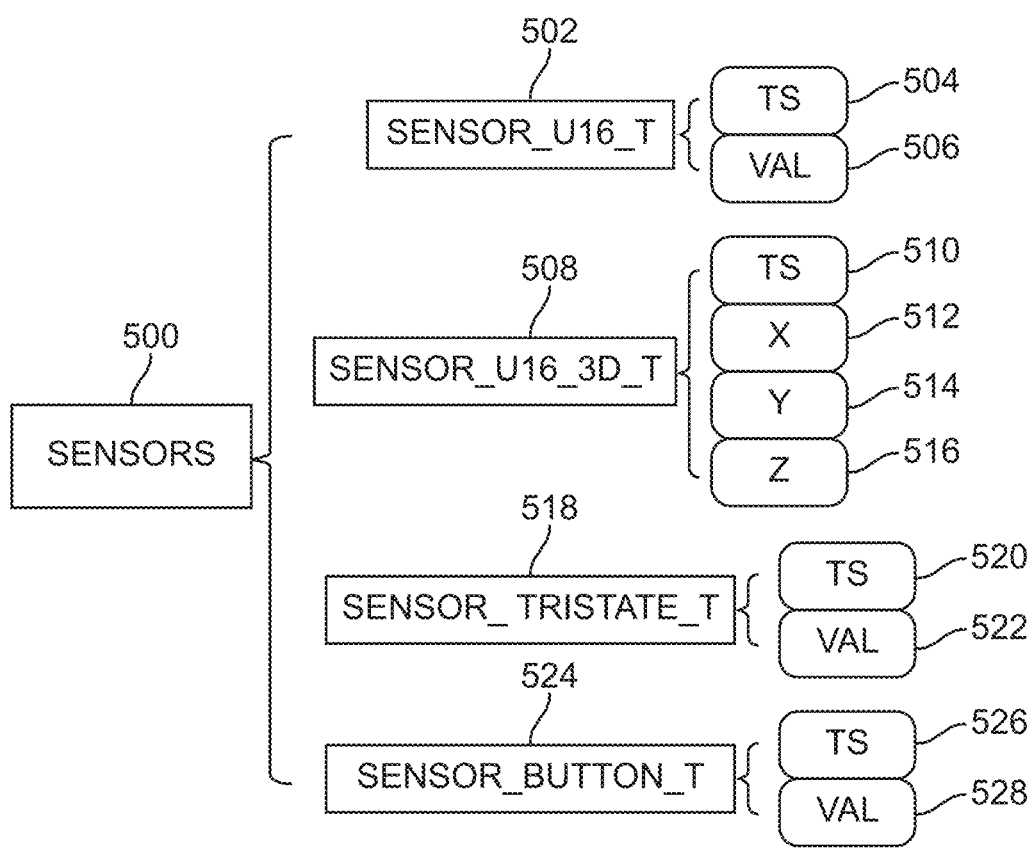
FIG. 5 is a block diagram that defines sensor data types recognized by the drying/styling device.

FIG. 5 is a block diagram that defines sensor data types recognized by the drying/styling device. In accordance with the preferred embodiment of the present invention, the sensor functionality 500 within the drying/styling device recognizes the following data modules. The first data type is the U16 sensor 502 that outputs an unsigned 16-bit word, whereby the data from this sensor is timestamped 504 at the time of when the value 506 was read from the sensor and the value is the unsigned word read from the sensor. The second data type is the U16 3D sensor 508, that outputs three (3) unsigned 16-bit words whereby there are four (4) fields of output data that comprise of the timestamp 510 from when the command was sent, the value read from the sensor in the x-dimension 512, the value read from the sensor in the y-dimension 514, and the value read from the sensor in the z-dimension 516. The third data type is the Tri-State Sensor 518 whereby output regarding the status of the Tri-State is generated to include the timestamp 520 and the value 522 read from the sensor. The last sensor type is the Button Sensor 524 whereby output is generated regarding button information, that is comprised of a timestamp 526 and value read 528 from the button sensor.

Figure 6:
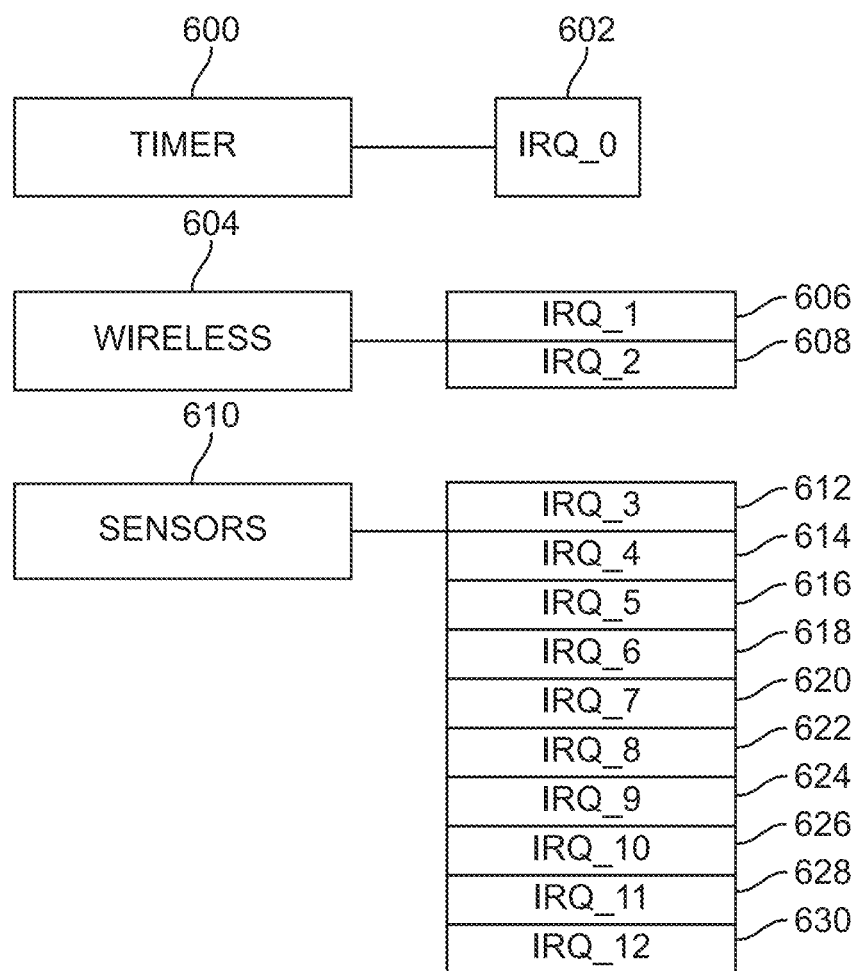
FIG. 6 is a block diagram of interrupt hardware mapping data within the internal processing queue of the drying/styling device.

FIG. 6 is a block diagram of interrupt hardware mapping data within the internal processing queue of the drying/styling device. In accordance with the preferred embodiment of the present invention, the internal processing module of the drying/styling device places sensing data in a queue to be processed in a time-sensitive manner. Some sensor material 610 may meet or exceed the predetermined threshold as programmed by the queue, such as an expired timer 600 or buffered packets that are ready to be processed from an external memory source. In each of these cases, it is desirable to service the time sensitive material as quickly as possible and defer the processing of that data to a less time-critical context. The block diagram shows how interrupt mappings are defined. On platforms where the number of hardware lines may be limited, these interrupts may be multiplexed onto a reduced number of interrupt lines, with the original source information made available as part of the payload data. Handlers for these interrupts are designed to execute in as little time as possible. As a result, most post commands onto the queue and return as opposed to servicing the request directly. Interrupt code "IRQ_0" 602 is designated for the timer module 600. The wireless module 604 has two (2) interrupt codes: "IRQ_1" 606 and "IRQ_2" 608, whereby "IRQ_1" 606 is designated for wireless 604 transmissions whereas "IRQ_2" 608 is designated for wireless 604 receiving. The remaining interrupts are designated for the sensor module 610. "IRQ_3" 612 is designated to transmit data for nearby temperature. "IRQ_4" 614 is designated to transmit data relating to the humidity levels detected. "IRQ_5" 616 is designated to transmit detected temperature data that is further away. "IRQ_6" 618 is designated for sensor data pertaining to the accelerometer. "IRQ_7" 620 is designated for sensor data pertaining to the gyroscope. "IRQ_8" 622 is designated for the sensor data pertaining to the magnetometer. "IRQ_9" 624 is designated to transmit data pertaining to distance. "IRQ_10" 626 is designated for data pertaining to the heat slider. "IRQ_11" 628 is designated for data pertaining to the fan slider, and "IRQ_12" 630 is designated for data pertaining to the cold shot button.

Figure 7:
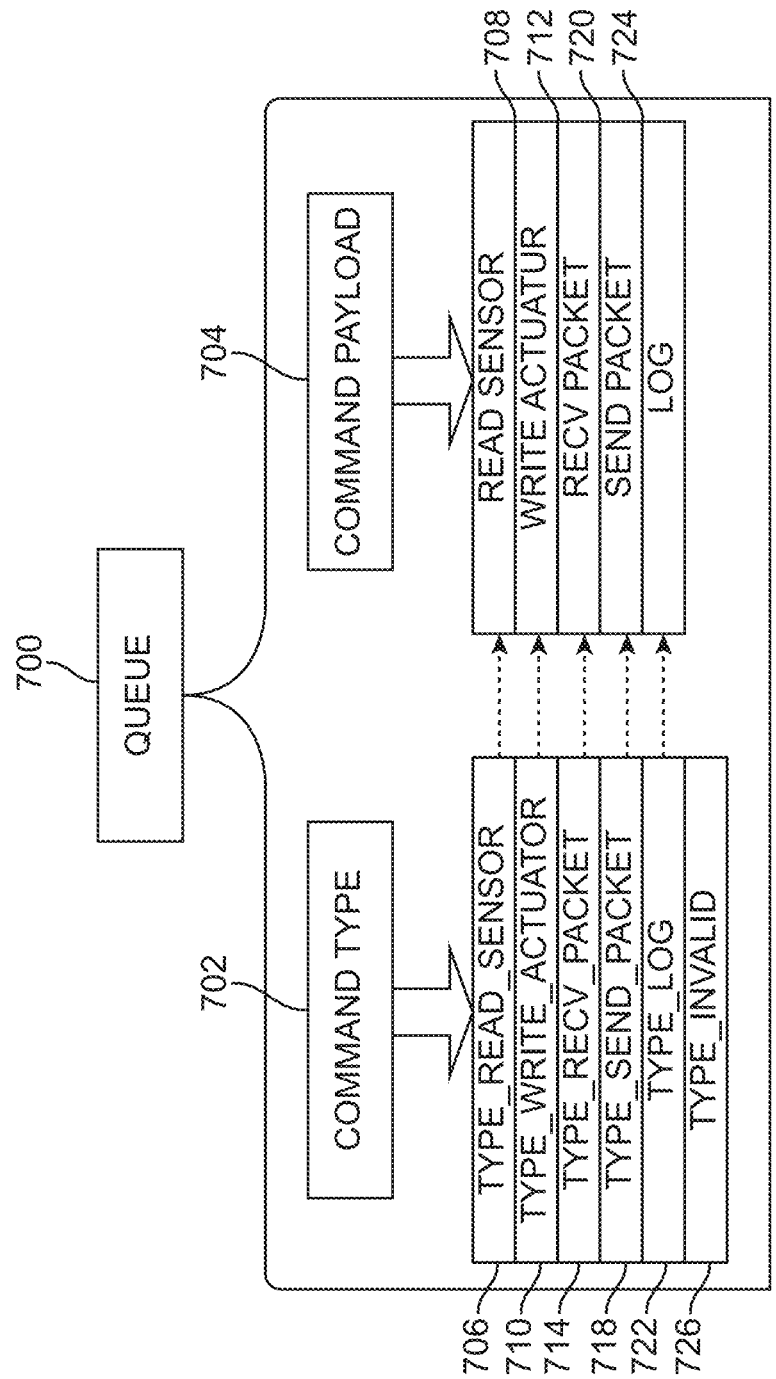
FIG. 7 is a block diagram detailing the command type and payload in relation to the messaging and request processing queue of the drying/styling device.

FIG. 7 is a block diagram detailing the command type and payload in relation to the messaging and request processing queue of the drying/styling device. In accordance with the preferred embodiment of the present invention, the queue 700 is defined as the central message broker that manages requests for work units to be performed. The queue 700 acts as Commands are produced 702 by interrupt events or the Dryer module and are consumed 704 by the Dryer module. Commands are inserted in a first-come, first-served basis with the item at index 0 being the oldest. The Queue 700 can either reside in the stack or heap, but the initial version of the product will allocate it in the stack so a fixed block memory can be statically allocated. As features are added, the expected time taken to process a Command in the queue once it is added may increase. If this becomes too long, it may become desirable to split the Queue into separate high priority and low priority queues where timing-critical applications are serviced first in the high-priority queue and work items of lesser importance are sent to the low priority queue. The Queue stores timestamps associated with each Command and can adapt behavior depending on load. For example, if the delta time from a Command being inserted and serviced exceeds a threshold, other modules may be instructed to increase their period, more memory may be allocated for the queue (for heap-based Queues), or certain modules may shut off entirely. The queue is made up of: the command type 702, which indicates what type of command the structure represents; and the command payload 704, which indicates the type specific details that are required to service the command. There are currently 6 command types and 5 corresponding command payloads that are entered in the queue: the command "type_read_sensor" 706 requires that the bitmask of sensors are to be read 708; the command "type_write_actuator" 710 prompts for the enumerated actuator value as well as the value sent to the actuator depending on a variety of meanings 712; the command "type_recv_packet" 714 requires the receipt of the packet data 720; the command "type_send_packet" 718 prompts the packet data to be sent 724; the command "type log" 722 prompts for access to the data log of the drying/styling device; and the command "type_invalid" 726 does not have a corresponding payload command as it is defined as invalid.

Figure 8:
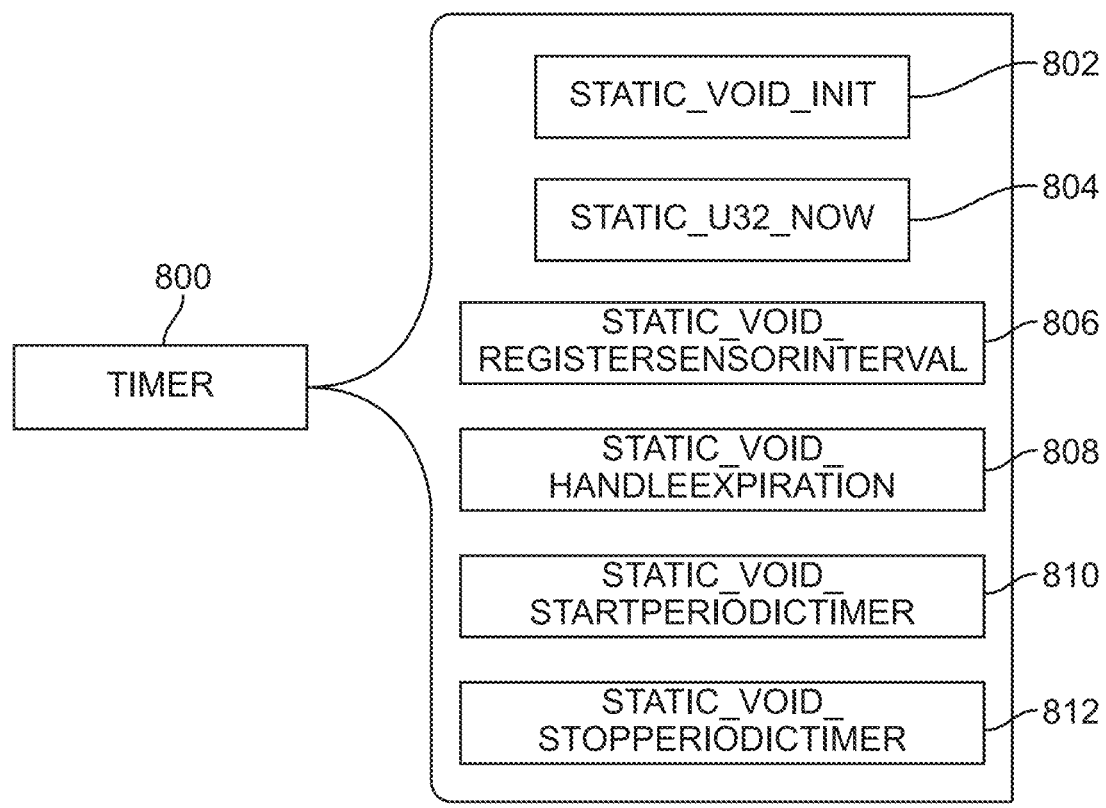
FIG. 8 is a block diagram of the commands posted in the processing queue from the timer module.

FIG. 8 is a block diagram of the commands posted in the processing queue from the timer module. In accordance with the preferred embodiment of the present invention, The Timer module 800 posts Commands in the Queue that direct the Dryer module to perform certain actions at periodic intervals. These actions contain tasks such as sensor polling or flushing logs. The timer module commands include the following: "static_void_init" 802, the command to initialize the timer module with the specific dryer instance, whereby the dryer's queue must be in a non-constant state and is modified in response to timer events; "static_u32_now" 804, the command that returns the uptime of the product within milliseconds; "static_void_registersensorinterval" 806, the command that requests for a specific sensor to be read at the specified period whereby if the request is called multiple times for the same sensor, the most recent value is used; "static_void_handleexpiration" 808, the command for the timer Interrupt Service Routine (ISR) handler that determines which sensors need to be read at the time of expiration and posts a "read_sensor" command to the queue; "static_void_startperiodictimer" 810, the command that enables periodic timer interrupts whereby the specific timer period will be the greatest common divisor of the registered periods; and "static_void_stopperiodictimer" 812, the command to disable periodic timer interrupts.

Figure 9:
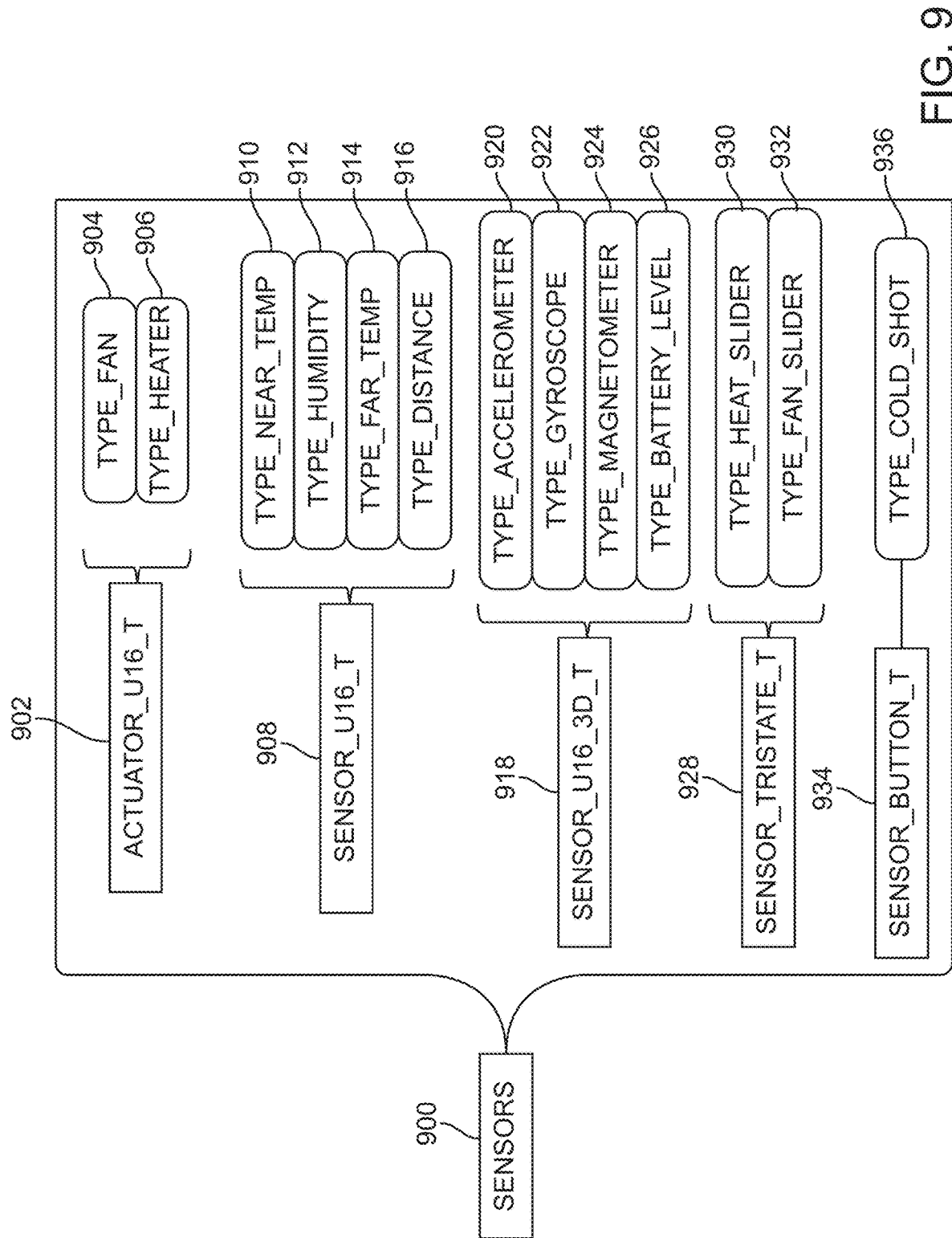
FIG. 9 is a block diagram of specific, defined sensors that represent specific instantiations of the generic sensor types defined in FIG. 5.

FIG. 9 is a block diagram of specific, defined sensors that represent specific instantiations of the generic sensor types defined in FIG. 5. In accordance with the preferred embodiment of the present invention, the recognized data within the sensor 900 functionality are specified further and linked with the corresponding data modules. The data module for "actuator_u16_t" 902 relates to both the fan 904 and heater 906 actuators. The fan actuator 904 controls the fan speed request, whereby the value specified indicates the requested voltage to supply to the fan's power rails depending on voltage units. The heat actuator 906 controls the heat temperature request, whereby the value specified indicates the requested voltage to supply to the heater's power rails depending on voltage units. The data module for "sensor_u16_t" 908 relates to: "type_near_temp" 910 or the contact temperature sensor; 'type_humidity" 912, the contact humidity sensor; "type_far_temp" 914, the contactless temperature sensor; and "type-distance" 916, the time of flight distance sensor. The data module for "sensor_u16_3d_t" 918 relates to: "type_accelerometer" 920, the accelerometer sensor on the Inertial Measurement Unit (IMU) board; "type_gyroscope" 922, the gyroscope sensor on the IMU board; "type_magnetometer" 924, the magnetometer sensor on the IMU board; and "type_battery_level" 926, the amount of remaining battery power for cordless dryers consisting of the current voltage, the estimated time remaining and an alternative measuring capability. The data module for "sensor_tristate_t" 928 relates to: "type_heat_slider" 930, the heat slider hardware control consisting of low, high, and auto heat settings; and "type_fan_slider" 932, the fan speed control slider hardware that consists of low, high, and auto speed settings. The data module for 'sensor_button_t" 934 relates to 'type_cold_shot" 936, the cold shot button control. Currently, all sensors are read via polling through the Timer interface. Future revisions of the product could allow the device to wake from a low-power sleep state through interrupts. For example, the device could automatically power on when picked up and power off when placed down by using the accelerometer sensor as an interrupt line. This would eliminate the need for the device to have an explicit power switch.

Figure 10:
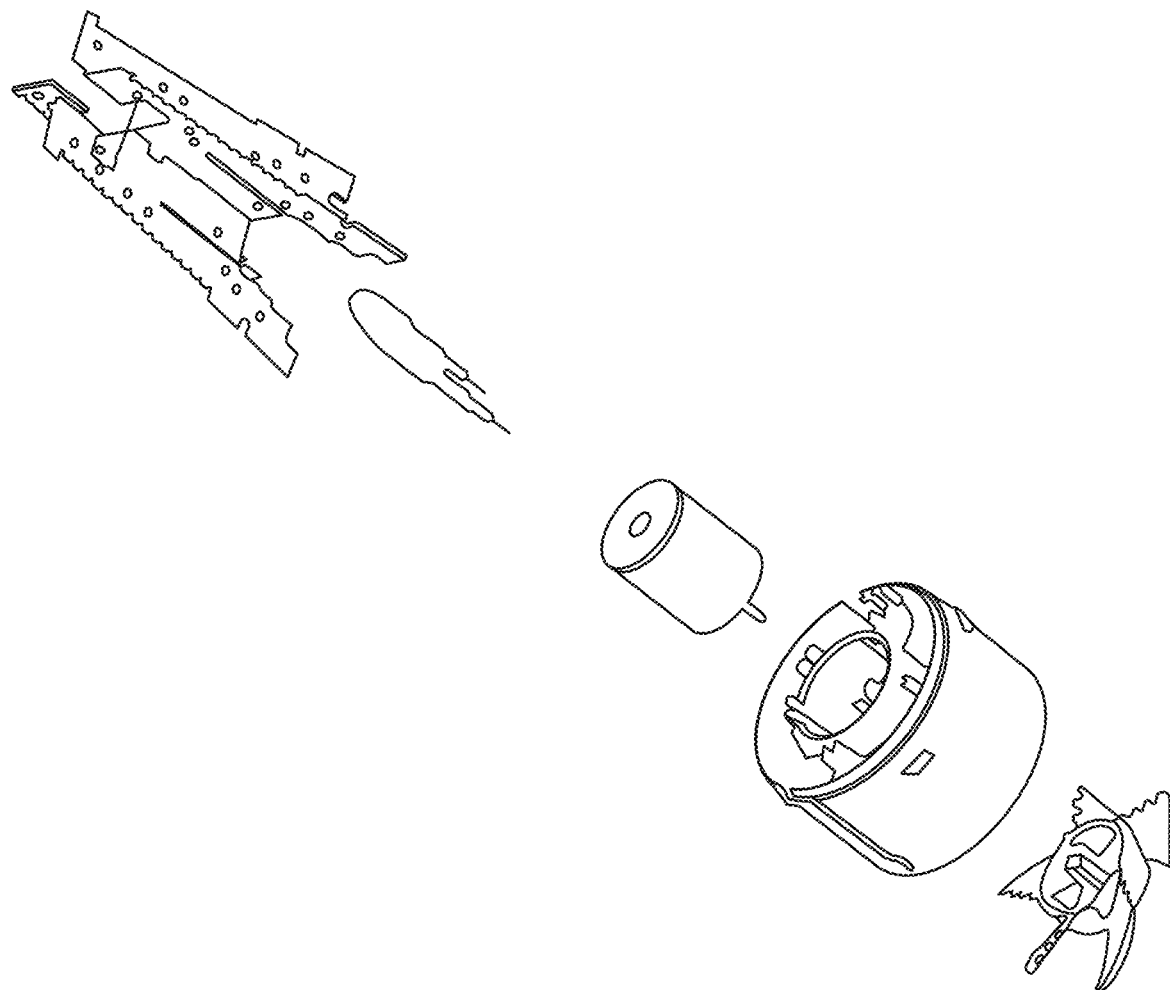
FIG. 10 is a schematic diagram of the heat element components used within the drying device.

FIG. 10 is a schematic diagram of the heat element components used within the drying device. In accordance with the preferred embodiment of the present invention, the drying device utilizes a heating element that is made up of a fan and a connected motor that are housed within a motor shroud. A ceramic holder connects the fan and motor to the mica sheet structure heater. Heat is generated within the mica sheet structure heater by an internal quartz infrared bulb that is held by the ceramic holder. Air is drawn through the motor powered fan intake, and directed into the heater, heated up using the quartz infrared bulb and forced through the heater plates.

Figure 11:
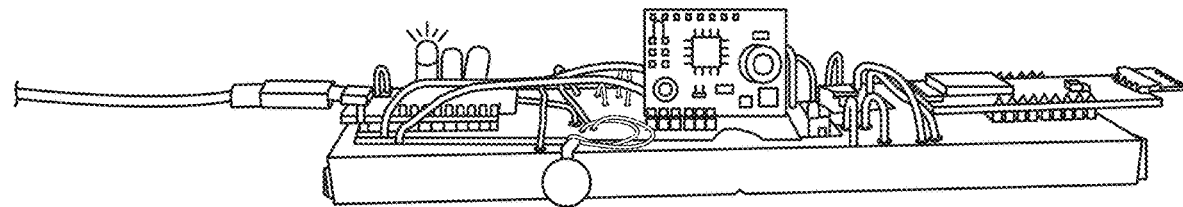
FIG. 11 is a set of images that demonstrates the light indicator functionality.
Figure 11:
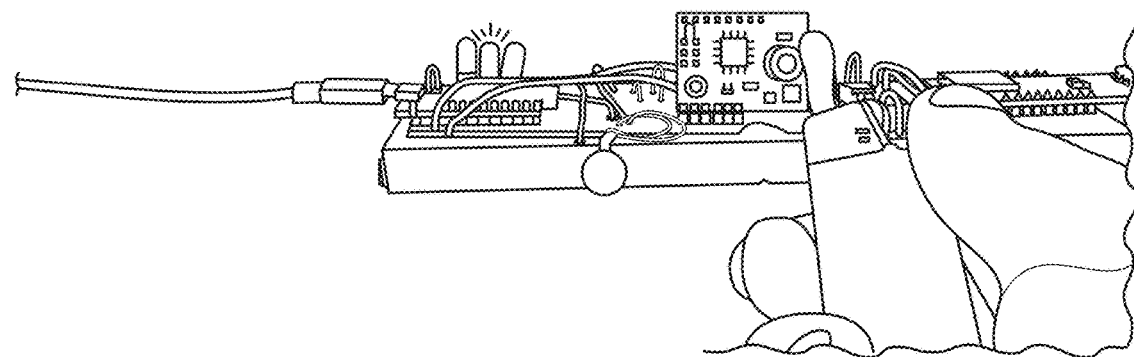
Figure 11:
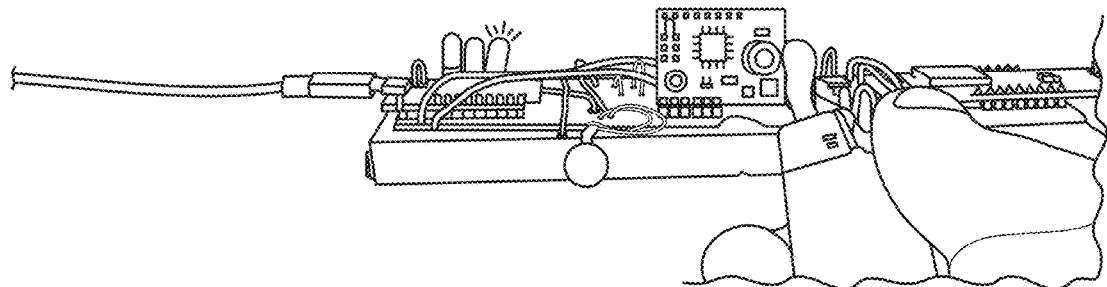

FIG. 11 is a set of images that demonstrates the light indicator functionality. In accordance with the preferred embodiment of the present invention, the light indicator displayed is a multi-colored status LED could be used to determine the suitability of the current conditions. As shown in the image example, the green light indicates a suitable hair temperature, whereby the temperature emitted by the drying/styling device is below a pre-calculated threshold A. The yellow light indicates the upper end of the acceptable range, whereby the temperature emitted by the drying/styling device is between A and a higher calculated threshold B. the red light indicator could indicate the hair is too hot, whereby the temperature of the remote surface is above B.

Figure 12:
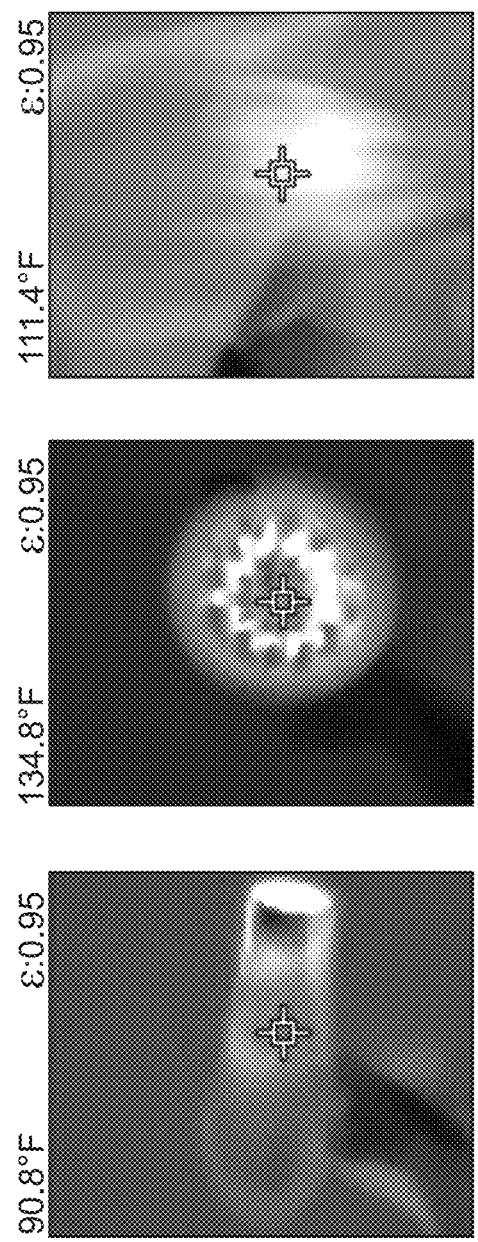
FIG. 12 is a visual representation of the contactless infrared sensor functionality.

FIG. 12 is a visual representation of the contactless infrared sensor functionality. In accordance with the preferred embodiment of the present invention, contactless infrared technology allows the temperature of a remote object to be measured without making physical contact with the object. The objective of the temperature sensor is to protect the hair, so the temperature of concern is the hair and not the dryer. From a usability standpoint, it is not ideal to place a sensor in physical contact with the hair. The relationship between the heater temperature and the hair temperature is not completely deterministic, since it depends on a variety of factors including the distance from the dryer to the hair, humidity of the room, and altitude. This means that estimates of the hair temperature are likely to have wide error margins that reduce the efficacy of the hair protecting solution. The displayed false-color photos show the electromagnetic radiation being emitted by a typical commercially available hair dryer and its result on a user's hair. The tip of the dryer is closest to the heating element, so it is emitting the most, while the wall behind the dryer is emitting less. Likewise, the emission from the hair I s maximized at the location the dryer is pointed. The first image displays a false-color infrared photograph of a profile view of a hair dryer while turned on. The second image displays the front view of a hair dryer while turned on, while the third image displays the user's hair while a hair dryer is in use.

Figure 13:
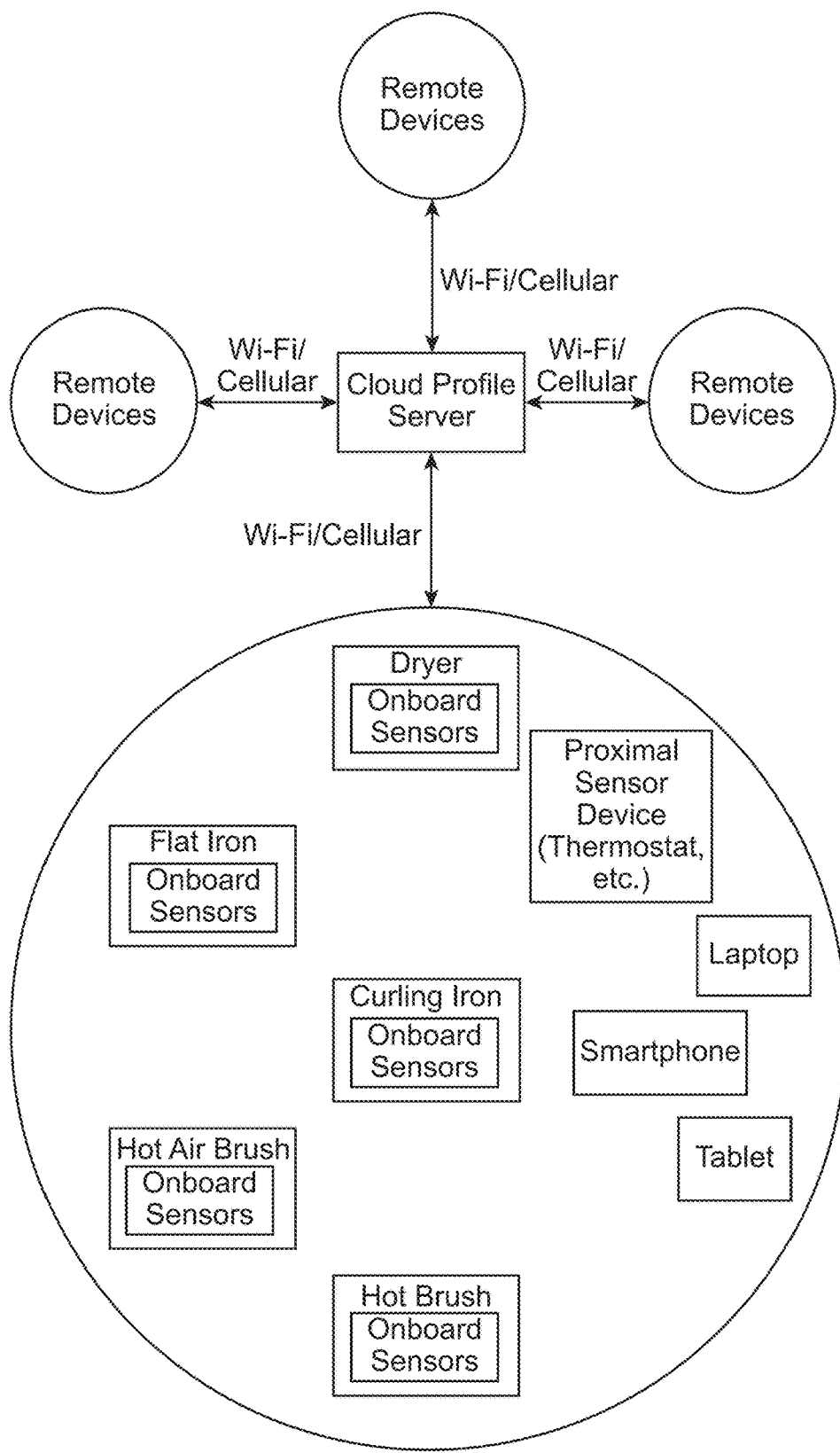
FIG. 13 shows a diagram showing the overview of how sensor and profile information can be shared across devices and locations.
Figure 14:
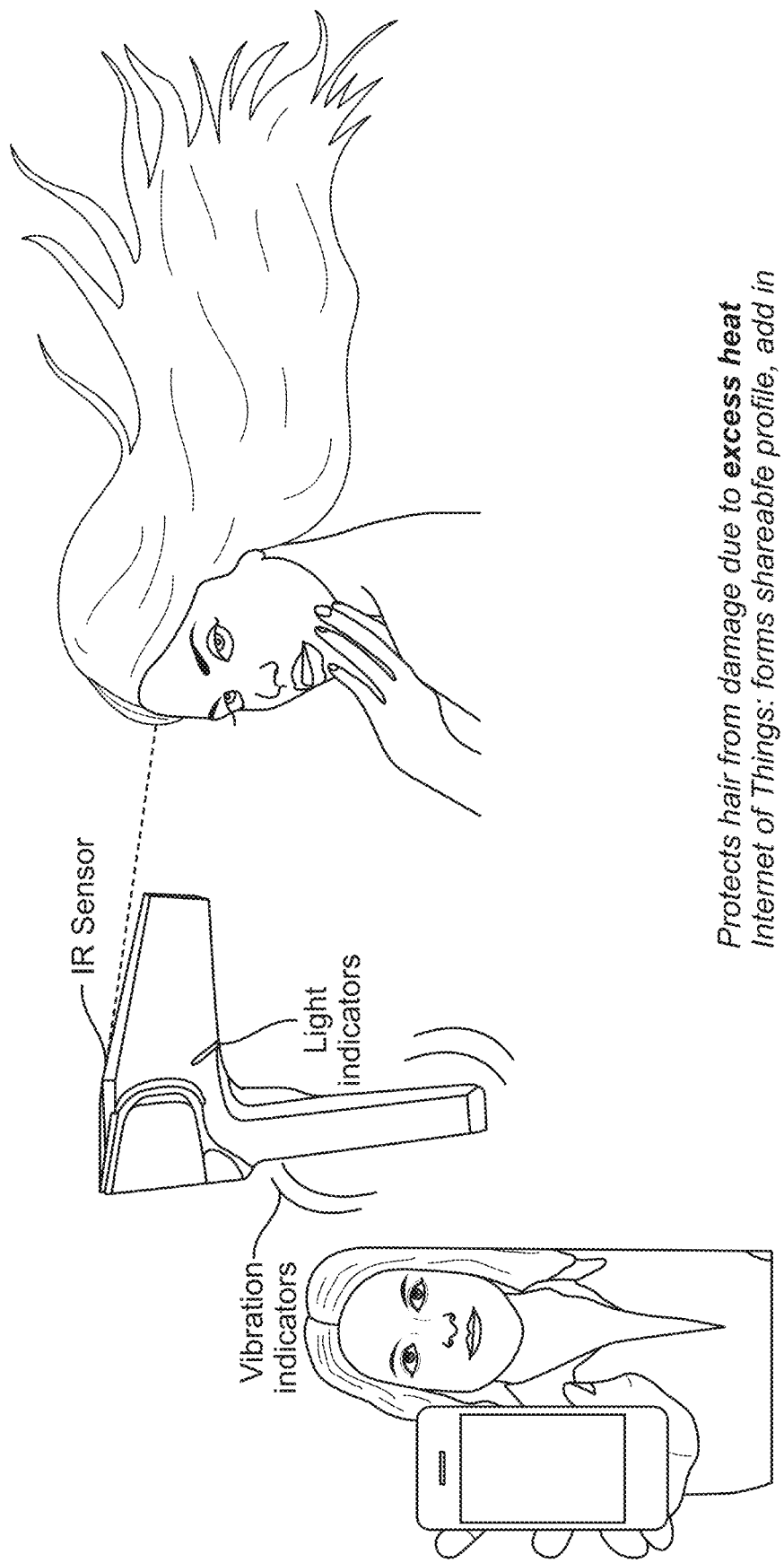
FIG. 14 is a sketch showing various features of the invention.

FIG. 13 shows a diagram showing the overview of how sensor and profile information can be shared across devices and locations. FIG. 14 is a sketch showing various features of the invention. In some embodiments, the information can be used to build a profile of the user's hair that can be stored on the styling or drying device, on a smartphone/tablet/laptop, or in the cloud. This profile information can be shared between various beauty products and can be used to recommend complementary products. When various devices are using the profile, they can adapt their behavior based on the information stored in the profile. For example, a consumer could purchase a hair dryer and configure it through a web site by uploading a picture of their hair and entering some additional information. Once this profile has been created, the dryer could fine-tune the heat and airflow to customize the behavior for the consumer.

In some embodiments, the same profile generated from the hair dryer may be used to customize the performance on other enhanced or smart devices. For example, if a consumer buys an enhanced flat iron, the use profile generated from the hair dryer could be used to customize the performance of the flat iron for their particular hair type. This process could be extended for other beauty products such as hot air brushes, curling irons and hot brushes.

If the profile information is stored on the consumer's smartphone or tablet or backed up in the cloud, then other devices could be customized to suit them. For example, a hotel dryer could be customized when it is in proximity of the consumer's smartphone.

Hair Profile

In some embodiments, the invention may be used to define a profile for each user's hair, consisting of:

Length

Density

Coarseness

Sheen

Moisture content

Follicle thickness

Curliness

Color treatment status

This profile can be used to configure parameters for various drying and styling devices. For example, thinner hair could cause a dryer to have a lower heat output since the additional heat may not be needed to dry the hair in a reasonable amount of time.

The profile could also adapt over time—by measuring how long the consumer takes to dry their hair multiple times and monitoring environmental factors such as temperature and humidity during the process, the dryer can better learn to adapt to the user's particular hair type.

Sensors Providing Information to the Profile

In some embodiments, the heating element could be controlled via sensors located on the device:

Contactless infrared thermometer—detect the remote temperature on the surface of the hair, shown in FIG. 14.

Contact thermometer (e.g., thermistor)—detect temperature of air exiting the dryer.

Ultrasonic sensor/time-of-flight light sensor—detect distance from tip of dryer to sensed object. Can be used to detect distance from dryer to hair.

Inertial sensors—detect how quickly the dryer is being moved in space.

In some embodiments, the proximal sensors could also be used to give a richer profile of the operating environment:

Phone's GPS—temperature/humidity/weather information.

Internet-enabled thermostat—ambient temperature and humidity of room.

Phone's camera—can be used to analyze the user's hair.

Feedback Mechanism

In some embodiments, the invention provides significantly richer insights into the consumer's usage habits than traditional beauty devices, additional feedback mechanisms are useful for communicating to the user in real-time. For example, if the user is holding the dryer too close to their hair or moving the flat iron too slowly and the hair could become damaged, it is desirable for the unit to provide feedback. The following feedback mechanisms have been contemplated:

Vibration motor—similar to a cell phone, the handle of the device could vibrate to indicate an undesirable state, shown in FIG. 14.

LED indicators—for units like flat irons where the consumer can often see the casing of the device, red/yellow/green status indicator LEDs can be used, shown in FIG. 14.

Buzzer/speaker—audible sounds/speech could be used to indicate certain conditions should change.

Proximal notifications—on the user's phone, for example.

Stored in the user's cloud profile for later coaching and feedback (similar to Fitbit but for styling).

There are different variations for the invention, for example, the hair styling devices could be:

Hair dryers

Flat irons

Curling irons

In some embodiments, the profile information could be stored:

Locally on the device.

On a proximal smartphone, tablet, or laptop/desktop and synced via Wi-Fi/Bluetooth.

On a remote server in the cloud.

In some embodiments, the profile information can be used to:

Control the heat output of products that could damage the hair.

Fine-tune the device to perform better on the consumer's particular type of hair.

Coach the consumer by giving them feedback on their performance based on sensor measurements and comparisons to other consumers and/or professional consumers.

Recommend other products specific for the consumer's hair type (e.g., other styling devices or consumables like hairspray, heat protectant, shampoo/conditioner, color treatment, etc.).

In some embodiments, the styling device could connect to the cloud:

Directly (e.g., onboard Wi-Fi modem).

Indirectly (e.g., via Bluetooth to a smartphone/tablet and the smartphone/tablet connects to the Internet).

The enhanced hair dryer disclosed herein is not obvious due to the following reasons:

Typical innovations in this space have focused around improving a single product such as a flat iron or hair dryer. Embodiments of the invention takes a holistic approach and allows findings from one styling device to be applied to others.

Instead of imposing a one-size-fits-all solution as is common in the field, embodiments of the invention allow the same device to behave differently for different consumers based on their individual preferences.

Some embodiments of the invention leverage recent advancements in the Internet of things and home automation to improving the hair drying/styling process.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

What is claimed is:

1. An intelligent hair drying/styling system comprising:
   a hair drying/styling apparatus having one or more heating elements and a fan assembly;
   control circuitry configured to control the one or more heating elements and the fan assembly, wherein the control circuitry is further configured to transmit the personalized hair profile to a smart device, local or cloud-based server;
   one or more sensors coupled to the control circuitry configured to:
      detect and evaluate one or more hair properties during use to develop an individual's personalized hair profile; and
      optimize hair drying/styling characteristics based on the personalized hair profile.

2. The intelligent hair drying/styling system of claim 1, wherein optimize includes adjusting heat output from the one or more heating elements and airflow speed from the fan assembly.

3. The intelligent hair drying/styling system of claim 2, wherein adjusting heat output includes measuring the temperature of the hair with the one or more sensors and decreasing the heat output to prevent damage to the hair.

4. The intelligent hair drying/styling system of claim 1, wherein the personalized hair profile may adapt over time by measuring how long the individual takes to dry the hair multiple times and measuring environmental factors during the drying process so the dryer can learn to adapt to the individual's hair type.

5. The intelligent hair drying/styling system of claim 1, wherein optimize may include: control heat output of the apparatus that could damage the hair; fine-tune the apparatus to optimize performance for the individual's hair profile; coach an individual by giving them feedback on performance and comparisons to other consumers or professional consumers; or recommend other products specific for an individual's hair profile.

6. The intelligent hair drying/styling system of claim 1, wherein optimize may include feedback selected from the group consisting of:
   a visual system of indicator lights on a hair dryer;
   a sensory system where a hair dryer vibrates in a user's hand;
   an automatic functionality whereby the dryer emits a blast of cool air; and
   an audio indicator system that alerts a user with an alarm sound.

7. The intelligent hair drying/styling system of claim 1, wherein the individual may view and update the personalized hair profile information using the smart device, local or cloud-based server.

8. The intelligent hair drying/styling system of claim 1, wherein the control circuitry is further configured to receive personalized hair profile from a smart device, local or cloud-based server.

9. The intelligent hair drying/styling system of claim 1, wherein the personalized hair profile may include individual's hair features selected from the group consisting of: length, density, coarseness, sheen, moisture content, follicle thickness, curliness, and color treatment status.

10. The intelligent hair drying/styling system of claim 1, wherein optimize includes a camera that uses computer technologies to determine the individual's hair type and style and provide optimal heat/airflow for the hair type and style.

11. An intelligent hair drying/styling system comprising:
    a hair drying/styling apparatus having one or more heating elements;
    control circuitry coupled to the hair drying/styling apparatus and configured to control the one or more heating elements;
    one or more sensors coupled to the control circuitry configured to:
       detect and evaluate one or more hair properties during use to develop an individual's personalized hair profile; and
       transmit the individual's personalized hair profile to a smart device, local or cloud-based server.

12. The intelligent hair drying/styling system of claim 11, wherein the individual may view and update the personalized hair profile information using the smart device, local or cloud-based server.

13. The intelligent hair drying/styling system of claim 11, wherein the personalized hair profile may adapt over time by measuring how long the individual takes to dry the hair multiple times and measuring environmental factors during the drying process so the dryer can learn to adapt to the individual's hair type.

14. The intelligent hair drying/styling system of claim 11, wherein the one or more sensors may also be configured to sense and provide feedback to the individual if the apparatus is operating in a manner that could damage the hair.

15. The intelligent hair drying/styling system of claim 14, wherein the feedback is selected from the group consisting of:
    a visual system of indicator lights on a hair dryer;
    a sensory system where a hair dryer vibrates in a user's hand;
    an automatic functionality whereby the dryer emits a blast of cool air; and
    an audio indicator system that alerts a user with an alarm sound.

16. The intelligent hair drying/styling system of claim 11, wherein the personalized hair profile can be used to: control heat output of other devices that could damage the hair; fine-tune the device to perform better on an individual's particular type of hair; coach an individual by giving them feedback on performance based on sensor measurements and comparisons to other consumers or professional consumers; or recommend other products specific for an individual's hair type.

17. An intelligent hair drying/styling system comprising:
a hair drying/styling apparatus having one or more heating elements;
control circuitry coupled to the hair drying/styling apparatus being configured to optimize the hair drying/styling characteristics based on the hair profile;
one or more sensors coupled to the control circuitry configured to:
  detect and evaluate one or more hair properties during use to develop an individual's personalized hair profile; and
  adapt the personalized hair profile over time by measuring how long the individual takes to dry the hair multiple times and measuring environmental factors during the drying process so the dryer can learn to adapt to the individual's hair type.

18. The intelligent hair drying/styling system of claim 17, wherein the control circuitry is further configured to transmit the personalized hair profile to a smart device, local or cloud-based server.

19. The intelligent hair drying/styling system of claim 17, wherein the personalized hair profile can be used to: control heat output of other devices that could damage the hair; fine-tune the device to perform better on an individual's particular type of hair; coach an individual by giving them feedback on performance based on sensor measurements and comparisons to other consumers or professional consumers; or recommend other products specific for an individual's hair type.

* * * * *